United States Patent Office 3,501,696
Patented Mar. 17, 1970

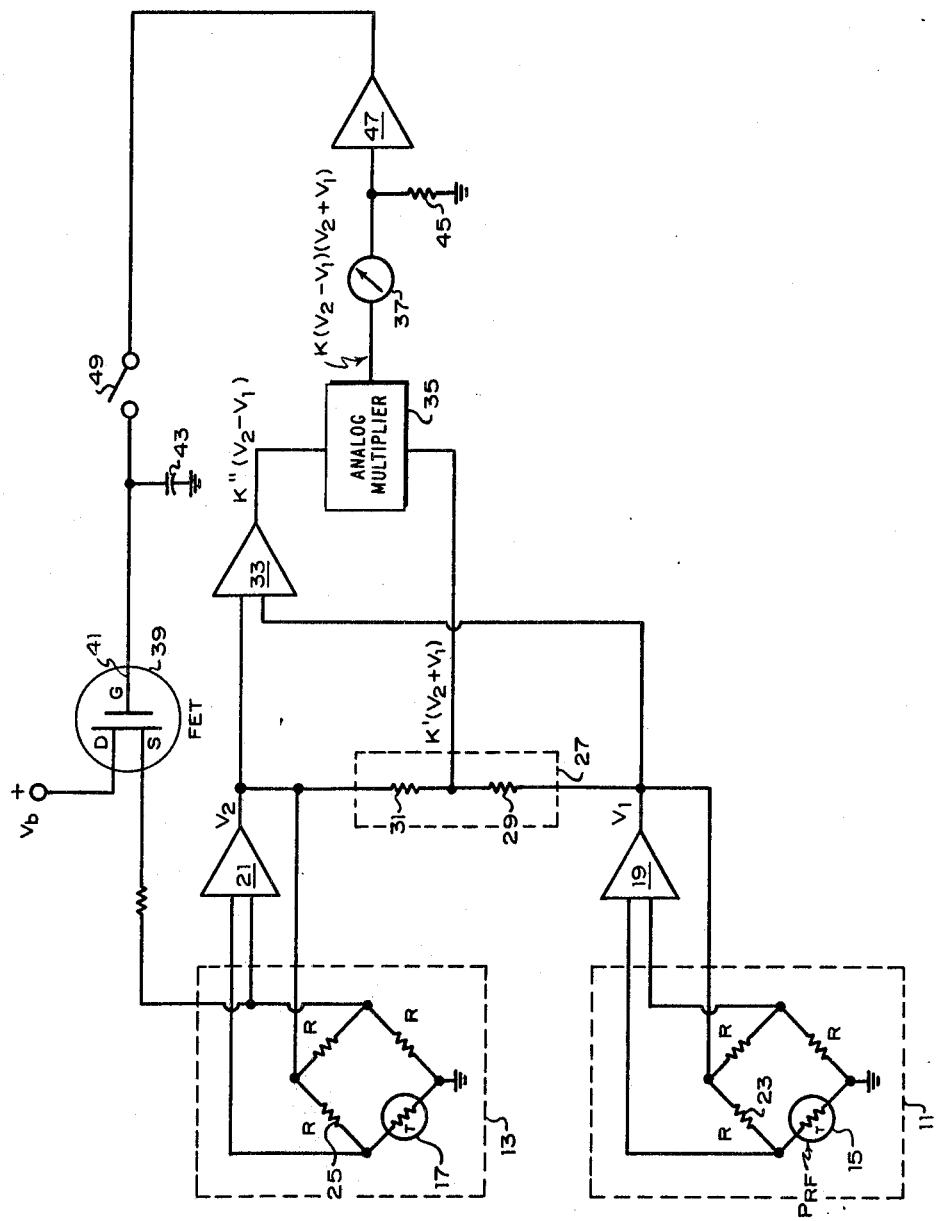

3,501,696
TEMPERATURE COMPENSATED R.F. POWER MEASURING DEVICE HAVING AUTOMATIC ZERO SETTING MEANS
Russell B. Riley, Portola Valley, Calif., assignor to Hewlett-Packard Company, Palo Alto, Calif., a corporation of California
Filed July 12, 1968, Ser. No. 744,486
Int. Cl. G01r 21/04, 1/02
U.S. Cl. 324—95  4 Claims

ABSTRACT OF THE DISCLOSURE

There are provided two bridge circuits, one of which includes a thermistor responsive to both R.F. power and ambient temperature, and the other of which includes a compensating thermistor responsive only to ambient temperature changes. Each of the two bridges is self-balanced by a D.C. differential amplifier in a feedback loop. A signal directly proportional to the R.F. power received is derived and applied to a meter. When a switch is momentarily closed, the signal applied to the meter also controls a field-effect transistor which adjusts the bias voltage for the temperature compensating thermistor to provide an accurate and fast means for zeroing the meter.

BACKGROUND OF THE INVENTION

It is well known that R.F. power may be measured with a bolometer element; however since such an element is temperature-sensitive, it is unable to distinguish between changes in the applied R.F. power level and changes in the ambient temperature. This problem is compounded when a bolometer element is used in a sensitive bridge circuit, because even minute temperature variations may be misinterpreted as changes in R.F. power. Power measurement accuracy may be improved if the bolometer bridge circuit output is compensated for variations in ambient temperature. Typical compensating devices include the use of another bolometer in a separate bridge circuit. Difficulties have been encountered in combining the outputs of the two bridge circuits in a simple and efficient manner that will provide accurate R.F. power measurements and long term stability. If the measured R.F. power is indicated directly on a meter scale, it is important that the meter be properly referenced to zero before a power reading is made. Even when ambient temperature compensation circuitry is used, it has generally been necessary to zero-calibrate the meter before each measurement in the most sensitive measuring ranges because the parameters of the circuit components change with time. Such frequent re-calibration is obviously time consuming when a large number of power measurements are made.

SUMMARY OF THE INVENTION

The illustrated embodiment of the present invention includes one bolometer bridge responsive to R.F. power, and another bolometer bridge responsive to ambient temperature changes in the region of the R.F. bolometer. Each of the two bridges is self-balanced by a D.C. amplifier connected in a feedback loop in a manner such that the amplified bridge unbalance signal provides the bridge excitation current. The outputs of the D.C. amplifiers are added and subtracted and the resulting sum and difference are multiplied by an analog multiplier. The output of the analog multiplier drives a meter which directly indicates R.F. power.

An important feature of the invention is the provision of means for automatically calibrating the meter for true zero and for maintaining this zero setting during a selected time interval. Zero calibration is achieved by adjusting the bias voltage of the ambient temperature sensitive bridge to equalize the outputs from the two D.C. feedback amplifiers. The bias voltage is controlled by gating means operable in a memory-hold configuration in response to the signal that drives the meter. The bias voltage control means may include, for example, a field-effect transistor having a high impedance input connected to a capacitor. This capacitor is charged to a particular voltage level to maintain the conductance of the field-effect transistor, and thus the bridge bias voltage, at a predetermined level during a selected time interval.

BRIEF DESCRIPTION OF THE DRAWING

The single figure of the drawing is a combined schematic and block diagram of the preferred embodiment of the present invention.

DESCRIPTION OF THE PREFERRED EMBODIMENT

Referring now to the figure, there are shown two similar bolometer bridge circuits 11 and 13, the former of which includes a thermistor element 15 for receiving R.F. power, $P_{RF}$, to be measured, and the latter of which includes a thermistor element 17 responsive to ambient temperature changes. Structurally, thermistor 17 is mounted in close physical and thermal proximity with R.F. thermistor 15; however, thermistor 17 is isolated or shielded from the incident R.F. power $P_{RF}$, so that the effects of ambient temperature variations on thermistor 15 can be compensated for, as hereinafter described.

The two bridges 11, 13 are respectively self-balanced by D.C. differential amplifiers 19 and 21, each of which is connected in a feedback loop with its corresponding bridge circuit. If an unbalanced condition appears in the power measuring bridge 11, amplifier 19 is driven so that the output voltage $V_1$ therefrom changes the excitation of this bridge to restore balance. Similarly, any unbalance in the ambient temperature sensitive bridge 13 will result in a compensatory change in the output voltage $V_2$ from amplifier 21.

The thermistors 15, 17 are chosen so that both have the same resistance at the ambient temperature and the same resistance change as a function of temperature. When no R.F. power is being received by thermistor 17, any variations in ambient temperature will cause both of the voltages $V_1$ and $V_2$ to change identically. Any changes in $V_1$ relative to $V_2$ are due solely to incident R.F. power received by thermistor 17. Thus, when $V_1$ and $V_2$ are used in combination to indicate R.F. power, the effects of ambient temperature variations are eliminated.

The voltages $V_1$ and $V_2$ from amplifiers 19, 21 are combined in a manner so as to produce a signal directly indicative of the R.F. power which is incident upon thermistor 15. The mathematical development leading to this combination may be derived on the basis of the following considerations:

The total power input, $P_{15}$, to the thermistor element 15 may be expressed by the following equation:

(1)
$$P_{15} = P_{RF} + \left(\frac{R_{15}}{R_{15}+R} V_1\right)^2 \frac{1}{R_{15}} = P_{RF} + \frac{R_{15}}{(R_{15}+R)^2} V_1^2$$

where $P_{RF}$ is the R.F. power incident upon thermistor element 15, $V_1$ is the excitation input voltage to bridge circuit 11, $R_{15}$ is the resistance of thermistor 15, and R is the resistance of fixed resistor 23.

Assuming that the nominal resistance of thermistor element 15 is within five or ten percent of the value R of resistor 23 in the bridge circuit 11, the total power $P_{15}$ from Equation 1 can be approximated with better than one percent accuracy by the following expression:

(2) $$P_{15} = P_{RF} + \frac{V_1^2}{4R}$$

where the parameters $P_{RF}$, $V_1$ and R are the same as those described above with respect to Equation 1.

Similarly the total power input to the thermistor element 17, $P_{17}$, may be approximated by the following expression:

(3) $$P_{17} \cong \frac{V_2^2}{4R}$$

where $V_2$ is the excitation input voltage to bridge 13 and R is the resistance of fixed resistor 25 in bridge circuit 13. It is to be noted that resistors 23, 25 have the same value, R.

If the voltage $V_2$ is made the same as $V_1$ when no R.F. power is received by thermistor 15, the total power input to each bridge will be equal and will be maintained equal, even when R.F. power is subsequently applied to thermistor 15, due to the self-balancing operation of the bridges. Therefore the right-hand terms of Expressions 2 and 3 above may be equated as follows:

(4) $$P_{RF} + \frac{V_1^2}{4R} = \frac{V_2^2}{4R}$$

The terms of Equation 4 may be transposed to yield the following expression for the R.F. power, $P_{RF}$:

(5) $$P_{RF} = \frac{1}{4R}(V_2^2 - V_1^2) = K(V_2 - V_1)(V_2 + V_1)$$

As illustrated in the drawing, a signal proportional to $(V_2 + V_1)$ is produced by a voltage divider network 27 formed by two resistors 29, 31 connected respectively to the outputs of amplifiers 19, 21. Also, a signal proportional to $(V_2 - V_1)$ is derived by the differential amplifier 33, the two inputs of which are connected to the outputs of amplifiers 19, 21. The output signals from voltage divider network 27 and differential amplifier 33 are multiplied by an analog multiplier 35, to produce a product which is proportional to $P_{RF}$, as can be seen from Equation 5 above. The output from analog multiplier 35 is connected to a meter 37, which is calibrated to provide a direct indication of the R.F. power received by thermistor 15.

Accurate power readings are insured by calibrating the meter 37 to a true zero reference point when no R.F. power is applied to the thermistor 15. This is achieved by equalizing the output voltages $V_1$ and $V_2$ from amplifiers 19, 21 with the result that the output signal from analog multiplier 35 goes to zero. The voltage $V_2$ is made equal to $V_1$ by appropriately biasing the bridge 13. The bias is varied by a field-effect transistor 39 having its source and drain electrodes connected in series between a bias voltage source $V_b$ and the bridge 13, as shown in the figure. Field-effect transistor 39 is an MOS (metal-oxide-silicon) device which has a gate electrode 41 insulated by a dielectric material to provide a high input impedance on the order of $5 \times 10^{13}$ ohms. Gate electrode 41 is connected to a capacitor 43 which is referenced to ground. The conduction of field-effect transistor 39 is controlled by a signal developed across a resistor 45 in the meter circuit. This signal is amplified by a D.C. amplifier 47 and applied through a normally open switch 49 to gate electrode 41 and capacitor 43.

Amplifier 47 and field-effect transistor 39 are in a feedback loop which permits the bias voltage of bridge circuit 13 to be automatically varied in response to the output of analog multiplier 35 until the voltage $V_2$ is equal to $V_1$. Specifically, when it is desired to calibrate meter 37 with a true zero setting, switch 49 is momentarily closed and field-effect transistor 39 conducts at a particular level in accordance with the equalizing voltage applied to gate 41 and capacitor 43. Thereafter, when switch 49 is opened, the charge on capacitor 43 maintains the field-effect transistor conducting at the same level. Thus the field-effect transistor operates in a memory mode to hold conduction at a predetermined level to zero-set the meter for a long time interval which is dependent on the size of capacitor 43 and the input resistance of gate 41. If capacitor 43 has a value of .5 mfd., this time interval is on the order of several hundred hours. It can be seen that the meter is automatically zeroed by the very quick and easy procedure of momentarily closing switch 49.

What is claimed is:
1. A temperature compensated device for measuring incident R.F. power comprising:
a first resistance bridge including variable resistance bolometer means for receiving said R.F. power to be measured;
first feedback amplifier means providing a D.C. output signal for automatically balancing said first resistance bridge in response to variations in the resistance of said bolometer means;
a second resistance bridge including variable resistance ambient temperature sensitive means thermally coupled to said bolometer means and isolated from said R.F. power;
second feedback amplifier means providing a D.C. output signal for automatically balancing said second resistance bridge in response to variations in the resistance of said ambient temperature sensitive means;
adder means for providing an output signal proportional to the sum of said D.C. output signals from said first and second feedback amplifier means;
differential amplifier means for providing an output signal proportional to the difference between said D.C. output signal from said first and second feedback amplifier means;
analog multiplier means for providing an output signal proportional to the product of the output signals from said adder means and said differential amplifier means; and
electrical meter means responsive to the output signal from said analog multiplier means for indicating directly the R.F. power received by said bolometer means.

2. The apparatus of claim 1, further including means responsive to the output signal from said analog multiplier means for equalizing the D.C. output signals from said first and second feedback amplifier means to zero-set said electrical meter for a selected time interval.

3. The apparatus of claim 2, said equalizing means including:
means providing a variable bias voltage output for biasing said second resistance bridge to adjust the magnitude of the D.C. output signal from said second feedback amplifier means;
D.C. amplifier means responsive to the output signal from said analog multiplier means for controlling said variable biasing means; and
switching means for conditioning said variable biasing means in a memory-hold configuration to maintain a predetermined bias voltage output for said selected time interval.

4. The apparatus of claim 3, said variable biasing means including:
a field-effect transistor having a first main current-carrying electrode connectable to a source of bias voltage, a second main current-carrying electrode connected to said second resistance bridge, and an insulated gate control electrode providing a high impedance input; and capacitor means coupled to said insulated gate control electrode and chargeable by said D.C. control amplifier means.

References Cited

UNITED STATES PATENTS 2,565,922  8/1951  Howard _____ 324—95 XR
2,997,652  8/1961  Engen _____ 324—95 XR RUDOLPH V. ROLINEC, Primary Examiner ERNEST F. KARLSEN, Assistant Examiner U.S. Cl. X.R.

324—130